(12) United States Patent
Mazzaro et al.

(10) Patent No.: US 9,395,434 B2
(45) Date of Patent: Jul. 19, 2016

(54) MULTITONE HARMONIC RADAR AND METHOD OF USE

(71) Applicant: U.S. Army Research Laboratory, Washington, DC (US)

(72) Inventors: Gregory James Mazzaro, Columbia, MD (US); Anthony F Martone, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 479 days.

(21) Appl. No.: 13/870,519

(22) Filed: Apr. 25, 2013

(65) Prior Publication Data
US 2015/0253415 A1    Sep. 10, 2015

(51) Int. Cl.
G01S 7/02      (2006.01)
G01S 13/04     (2006.01)
G01S 7/35      (2006.01)
G01S 7/41      (2006.01)
G01S 13/88     (2006.01)

(52) U.S. Cl.
CPC . *G01S 7/02* (2013.01); *G01S 7/354* (2013.01); *G01S 7/414* (2013.01); *G01S 13/04* (2013.01); *G01S 13/887* (2013.01)

(58) Field of Classification Search
CPC ..... G01S 13/106; G01S 13/343; G01S 13/87; G01S 13/885
USPC .................................................. 342/175–176
See application file for complete search history.

(56) References Cited

U.S. PATENT DOCUMENTS

| | | | |
|---|---|---|---|
| 3,732,567 A | 5/1973 | Low et al. | |
| 3,781,879 A | 12/1973 | Staras et al. | |
| 3,972,042 A | 7/1976 | Johnson | |
| 4,053,891 A | 10/1977 | Opitz | |
| 4,646,083 A * | 2/1987 | Woods | 340/855.3 |
| 5,191,343 A | 3/1993 | Danzer et al. | |
| 6,049,301 A | 4/2000 | Weagant | |
| 6,060,815 A | 5/2000 | Nysen | |

(Continued)

OTHER PUBLICATIONS

M.A. Flemming, et al., "Harmonic Radar Detection Systems," Proceedings of the IEE International Conference Radar-77, pp. 1223-1231(Oct. 1977).

(Continued)

*Primary Examiner* — Timothy A Brainard
(74) *Attorney, Agent, or Firm* — Lawrence E. Anderson

(57) ABSTRACT

A multitone nonlinear radar system (and a method of operating such a system) comprising a transmitter that transmits a signal comprising at least two predetermined frequency components; a receiver operating to receive return signals comprising harmonics of at least two predetermined frequencies, combinations of the at least two predetermined frequency components, and combinations of the harmonics of the at least two predetermined frequency components that are within a predetermined selected frequency range that has been predetermined to enable detection and/or classification of an electronic device; at least one antenna operating to transmit and receive electromagnetic radiation operatively connected to the transmitter and receiver; the receiver comprising at least one high pass filter for attenuating linear reflections at the two predetermined frequencies, and an analyzer;

whereby electronic devices may be detected and identified by analyzing return signals within a predetermined frequency range.

20 Claims, 10 Drawing Sheets

Multitone radar data: 3 targets, $M = 2$, $f_{sep} = 5$ MHz.

(56) References Cited

U.S. PATENT DOCUMENTS

| | | | |
|---|---|---|---|
| 6,163,259 | A | 12/2000 | Barsumian et al. |
| 6,765,527 | B2 | 7/2004 | Jablonski |
| 6,856,275 | B1 | 2/2005 | Ehlers et al. |
| 6,894,614 | B2 | 5/2005 | Eckstein et al. |
| 6,897,777 | B2 | 5/2005 | Holmes et al. |
| 7,777,671 | B2 | 8/2010 | Schnitzer et al. |
| 7,830,299 | B2 | 11/2010 | Steele |
| 8,131,239 | B1 | 3/2012 | Walker et al. |
| 8,904,522 | B1 * | 12/2014 | Kambhampati et al. ........ 726/22 |
| 2008/0036645 | A1 * | 2/2008 | Yamano et al. ............... 342/109 |
| 2008/0231497 | A1 * | 9/2008 | Sakamoto ....................... 342/70 |
| 2009/0009380 | A1 * | 1/2009 | Schnitzer ............. G01S 13/106 342/90 |
| 2009/0262010 | A1 * | 10/2009 | Kwak et al. .................... 342/145 |
| 2010/0188211 | A1 * | 7/2010 | Brommer ............... G06K 17/00 340/539.32 |
| 2012/0024042 | A1 * | 2/2012 | Vass et al. ..................... 73/23.34 |

OTHER PUBLICATIONS

J. R. Wilkerson, P. G. Lam, K. G. Gard, and M. B. Steer, "Distributed Passive Intermodulation Distortion on Transmission Lines," IEEE Transactions on Microwave Theory and Techniques, vol. 59, No. 5, pp. 1190-1205 (May 2011).

F. Arazm and F. A. Benson, "Nonlinearities in Metal Contacts at Microwave Frequencies," IEEE Transactions on Electromagnetic Compatibility, vol. 22, No. 3, pp. 142-149 (Aug. 1980).

P. L. Lui and A. D. Rawlins, "Passive non-linearities in antenna systems," IEE Colloquium on Passive Jntermodulation Products in Antennas and Related Structures, pp. 1-7 (Jun. 1989).

G. C. Bailey and A. C. Ehrlich, "A Study of RF Nonlinearities in Nickel," Journal of Applied Physics, vol. 50, No. 1, pp. 453-461 (Jan. 1979).

A. Singh and V. M. Lubecke, "Respiratory Monitoring and Clutter Rejection Using a CW Doppler Radar With Passive RF Tags," IEEE Sensors Journal, vol. 12, No. 3, 558-565, (Mar. 20, 2012).

Axell, e., et al., "Spectrum Sensing for Cognitive Radio," IEEE Signal Processing Magazine, vol. 29, No. 3, pp. 101-116 (May 2012).

M. Ressler, L. Nguyen, F. Koenig, D. Wong, and G. Smith, "The Army Research Laboratory (ARL) Synchronous Impulse Reconstruction (SIRE) Forward-Looking Radar," Proceedings of the SPIE, vol. 6561 (Apr. 2007).

J. L. Osborne, S. J. Clark, R. J. Morris, I. H. Williams, J. R. Riley, A. D. Smith, D. R. Reynolds, and A. S. Edwards, "A Landscape-Scale Study of Bumble Bee Foraging Range and Constancy, Using Harmonic Radar," Journal of Applied Ecology, vol. 36, No. 4, pp. 519-533 (Sep. 1999).

B. G. Colpitts, "Harmonic Radar Transceiver Design: Miniature Tags for Insect Tracking," IEEE Transactions on Antennas and Propagation, vol. 52, No. 11, pp. 2825-2832, (Nov. 2004).

R. D. Brazee, E. S. Miller, M. E. Reding, M. G. Klein, B. Nudd, and H. Zhu, "A Transponder for Harmonic Radar Tracking of the Black Vine Weevil in Behavioral Research," Transactions of the American Society of Agricultural Engineers, vol. 48, No. 2, pp. 831-838 (2005).

J. Kiriazi, J. Nakakura, K. Hall, N. Hafner, and V. Lubecke, "Low Profile Harmonic Radar Transponder for Tracking Small Endangered Species," Proceedings of the 29th Annual International Conference of the IEEE Engineering in Medicine and Biology Society, vol. 48, No. 2, pp. 2338-2341 (Aug. 2007).

F. Meloche and P. M. Albert, "A lighter transponder for harmonic radar," Proceedings of the 3rd European Radar Conference, pp. 233-236, (Sep. 2006).

M. E. O'Neal, D. A. Landis, E. Rothwell, L. Kempel, and D. Reinhard, "Tracking Insects with Harmonic Radar: A Case Study," American Entomologist, vol. 50, No. 4, pp. 212-218 (2004).

U. Olgun, D. Psychoudakis, C. C. Chen, and J. L. Volakis, "High Gain Lightweight Array for Harmonic Portable RFID Radar," IEEE Antennas and Propagation Society International Symposium, pp. 1-4 (Jun. 2009).

N. Tahir and G. Brooker, "Recent Developments and Recommendations for Improving Harmonic Radar Tracking Systems," Proceedings of the 5th European Conference on Antennas and Propagation, pp. 1531-1535 (Apr. 2011).

C. Feige, T. Ostertag, M. Loschonsky, and L. M. Reindl, "Radar assisted detection of passive electronic components," IEEE Radio and Wireless Symposium, pp. 200-203 (Jan. 2010).

A. F. Martone, A. K. Mikkilineni, and E. J. Delp, "Forensics of Things," IEEE Southwest Symposium on Image Analysis and Interpretation, pp. 149-152 (2006).

J. Shefer, R. J. Klensch, G. Kaplan, and H. C. Johnson, "Clutter-Free Radar for Cars," Wireless World, pp. 117-202 (May 1974).

V. Viikari, et al., "Technical Solutions for Automotive Intermodulation Radar for Detecting Vulnerable Road Users," IEEE 69th Vehicular Technology Conference, pp. 1-5 (Apr. 2009).

L. Chioukh, H. Boutayeb, K. Wu, and D. Deslandes, "Monitoring Vital Signs Using Remote Harmonic Radar Concept," European Radar Conference, pp. 381-384 (Oct. 2011).

C. Stagner, et al., "A practical superheterodyne-receiver detector using stimulated emissions," IEEE Trans. Instrum. Meas., vol. 60, No. 4, pp. 1461-1468 (Apr. 2011).

G. J. Mazzaro and K. D. Sherbondy, "Combined Linear & Nonlinear Radar: Waveform Generation and Capture," U.S. Army Research Laboratory Technical Report, No. 6427, Apr. 2013.

Crowne, F. ; Fazi, C.,"Nonlinear radar signatures from metal surfaces," Radar Conference—Surveillance for a Safer World, 2009. Radar. International.

A. Martone, D. McNamara, G. Mazzaro, and A. Hedden, "Cognitive Nonlinear Radar," U.S. Army Research Laboratory Memorandum Report, No. 0837, Jan. 2013.

\* cited by examiner

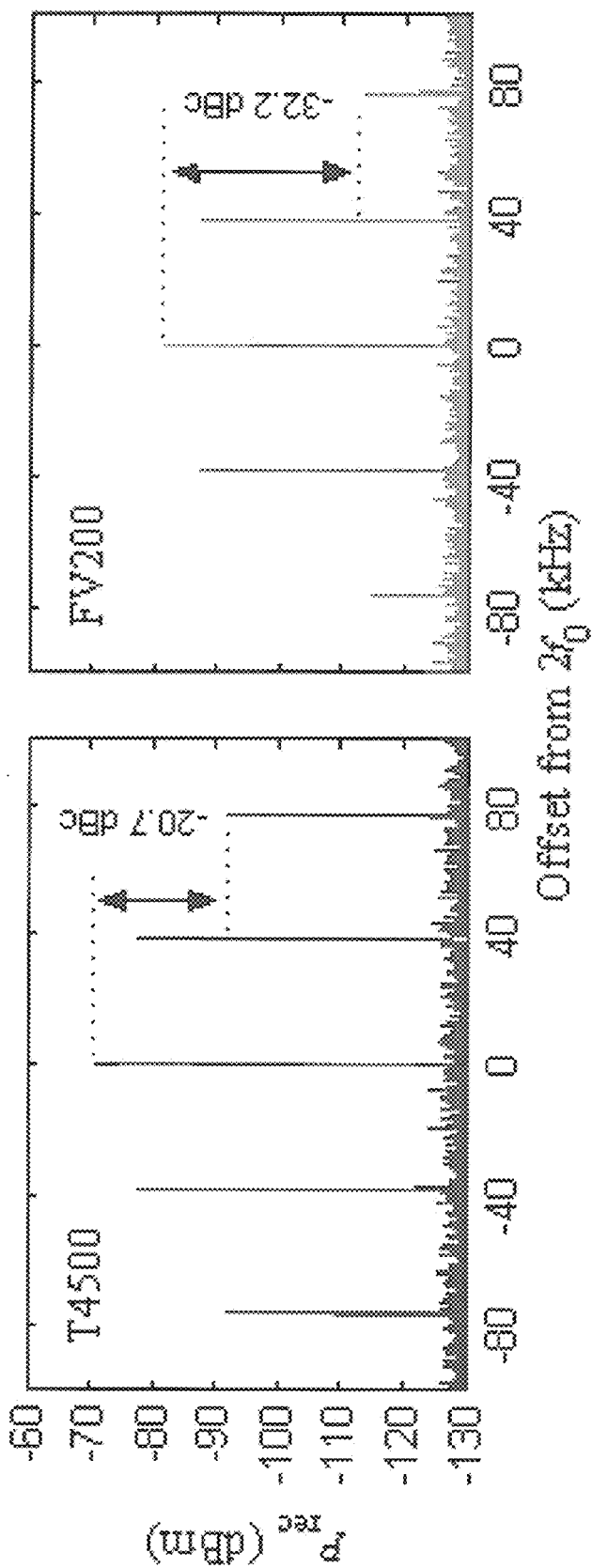
FIG. 2 Nonlinear response recorded from two DUTs at $f_0 = 756$ MHz, corresponding to the first row of Table 1.

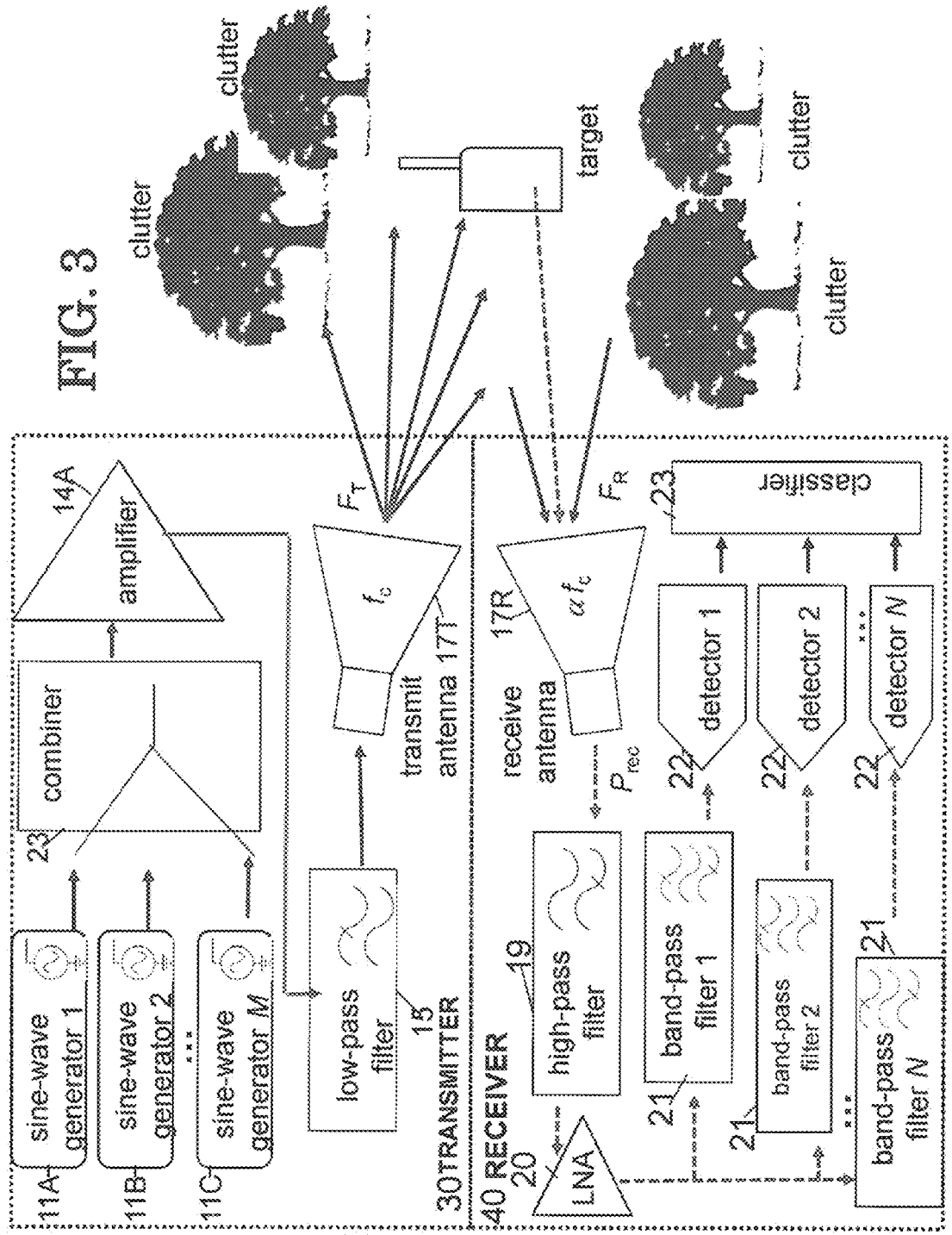

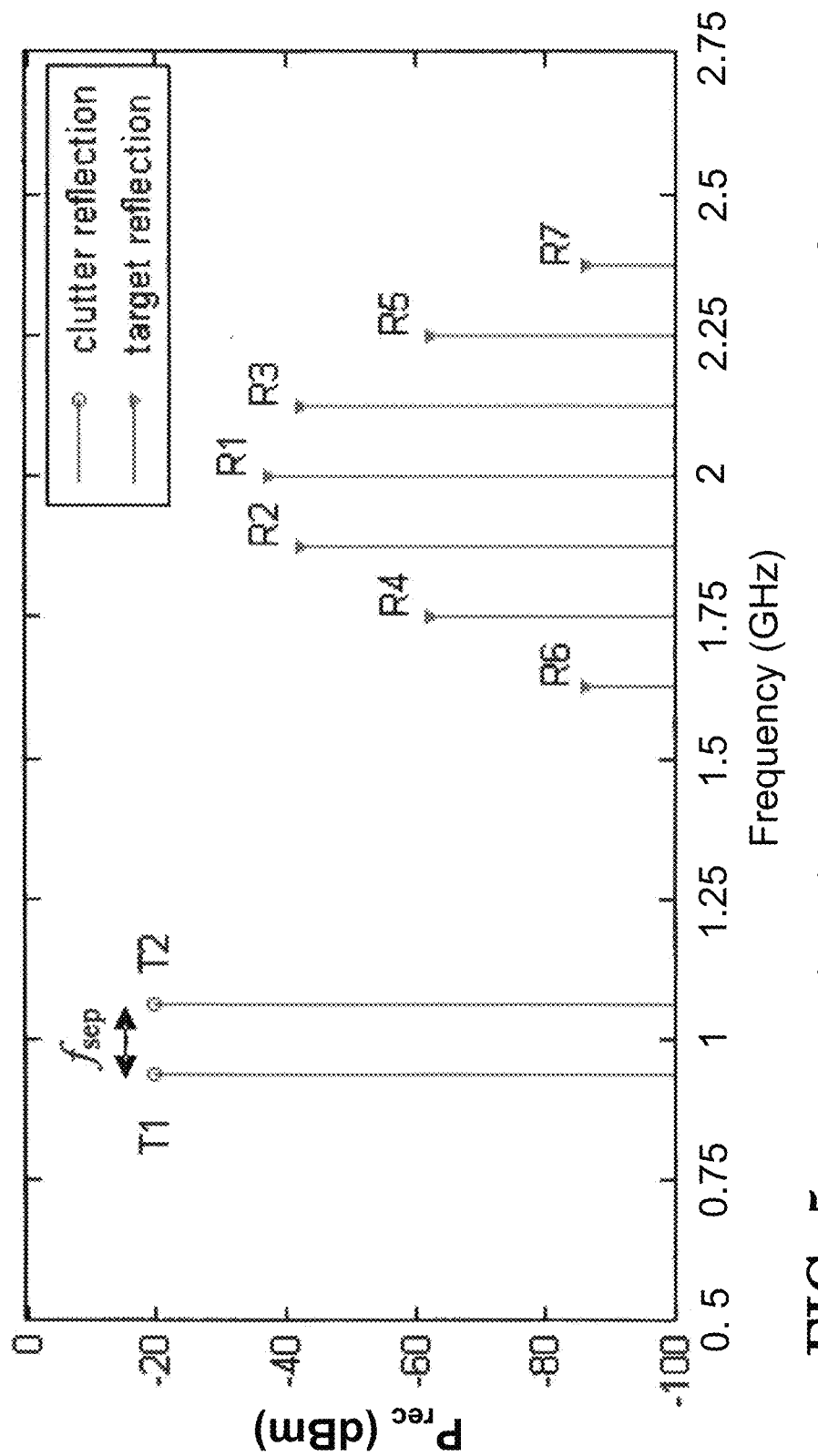
FIG. 5 Harmonic radar return: $M = 2$, $N = 7$, $\alpha = 2$, $f_c = 1$ GHz.

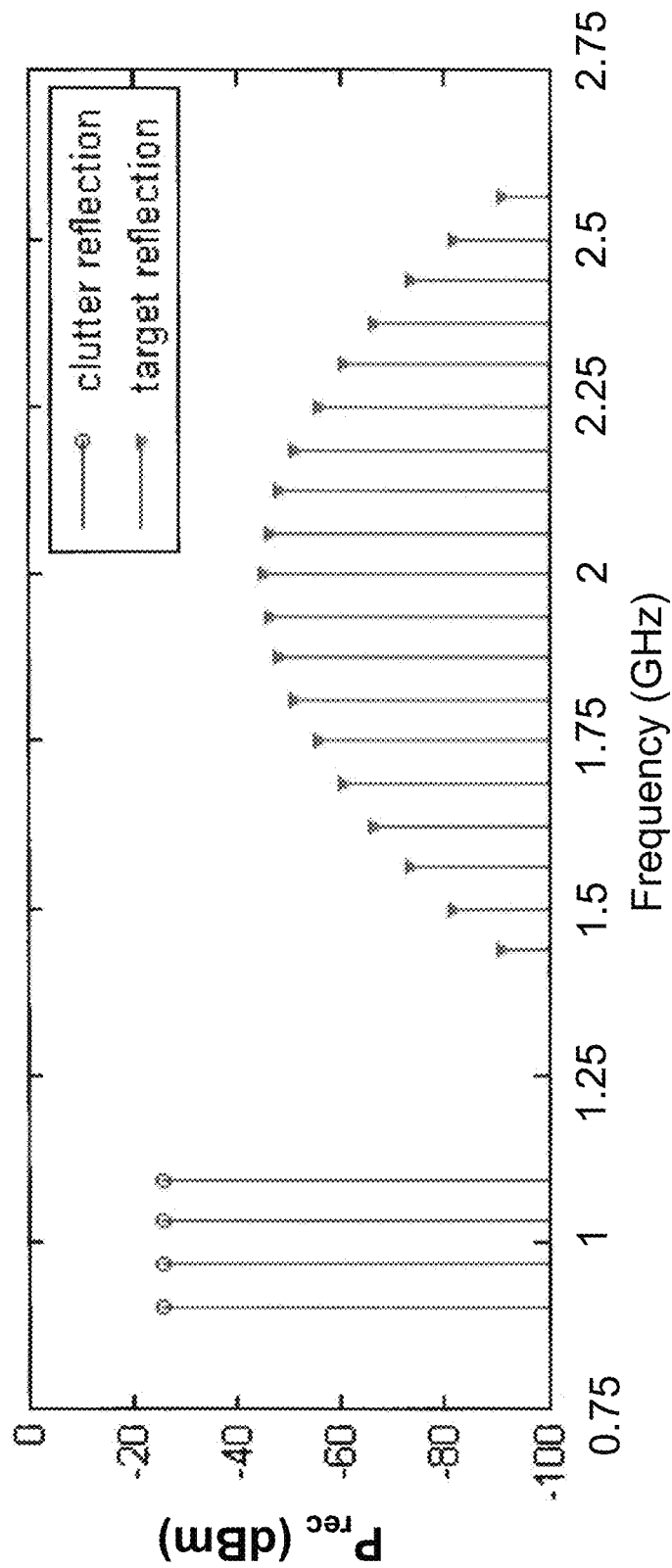
FIG. 6  Harmonic radar return: $M = 4$, $N = 19$, $\alpha = 2$, $f_c = 1$ GHz.

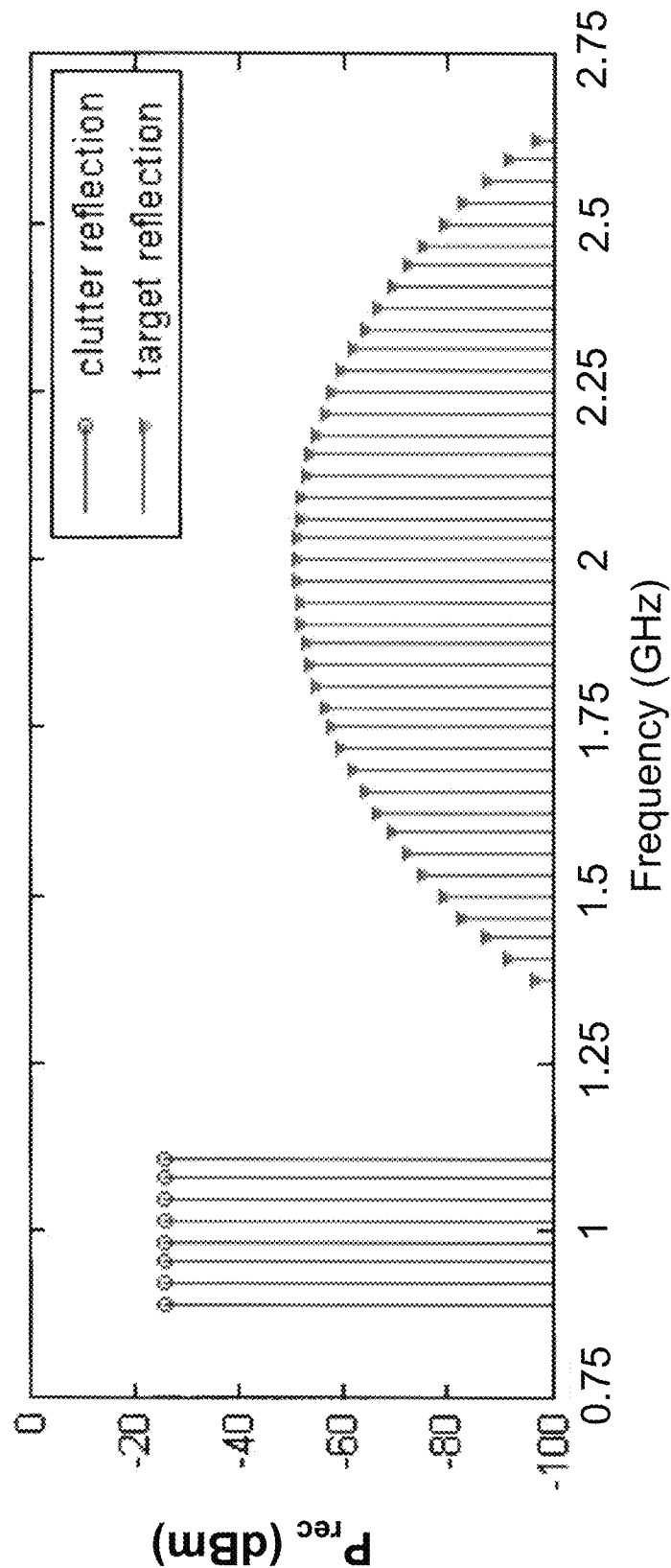
FIG. 7  Harmonic radar return: $M = 8$, $N = 41$, $\alpha = 2$, $f_c = 1$ GHz.

Multitone radar data: 3 targets, $M = 2$, $f_{sep} = 5$ MHz.

Multitone radar data: 3 targets, $M = 2$, $f_{sep} = 5$ MHz.

MULTITONE HARMONIC RADAR AND METHOD OF USE

STATEMENT OF GOVERNMENT INTEREST

The invention described herein may be manufactured, used, and licensed by or for the United States Government without the payment of royalties.

BACKGROUND

In the theater-of-operations, warfighters encounter threats that contain RF electronics. Such RF electronic devices are generally small (man-portable) and typically buried or located close to the ground, making it difficult to distinguish from background clutter using traditional linear radar.

Whereas linear radar exploits the reflection from a target whose frequencies are the same as those transmitted, nonlinear radar exploits the electronic response from a target whose reflected frequencies are different from those transmitted. Reception of frequencies that are not part of the transmitted probe distinguishes the received signal from a linear return that can be produced by clutter and indicates the presence of an electronic circuit. For the warfighter, the presence of an electronic circuit (in a location that typically does not contain an electronic circuit) implies the presence of a threat. Ultra-wideband (UWB) ground-penetrating radar (GPR) is a linear radar technology for detecting concealed targets such as landmines and other explosive devices. UWB GPR attempts to detect a threat set similar to that of the present invention. Since electronics and clutter both produce linear radar reflect ions, UWB GPR systems require a greater degree of signal processing to separate targets from clutter. By confining the detectable target response to nonlinear interactions, nonlinear radar is able to more easily separate targets from clutter.

Nonlinear radar is capable of detecting almost any unshielded electronics, whether the electronics are on or off. Nonlinear radar exploits the electronic response from a target whose reflected frequencies are different from those transmitted. Reception of frequencies that are not part of the transmitted probe distinguishes the received signal from a linear return produced by clutter and indicates the presence of electronics. Several devices and methods exist for identifying electronics and other manmade objects using the nonlinear responses of metal and semiconductor junctions. Some detectors tune to the harmonics of a single-frequency radar transmission, such as in U.S. Pat. No. 3,732,567 to Low. Other detectors tune to the intermodulation produced by the interaction of multiple frequencies at the target, such as discussed in "A practical superheterodyne-receiver detector using stimulated emissions," by C. Stagner, et al., in IEEE Trans. Instrum. Meas., vol. 60, no. 4, pp. 1461-1468 (April 2011) (herein incorporated by reference). In the Stagner, et al. paper, the unintended emissions of super heterodyne receivers are analyzed for the detection of radio-controlled explosives. Arbitrary signals are injected into a radio's unintended emissions using a relatively weak stimulation signal, referred to as stimulated emissions. Intermodulation products are generally the result of odd-order nonlinear interactions.

SUMMARY OF THE INVENTION

A preferred embodiment of the present invention is directed to a type of nonlinear radar that transmits multiple frequencies and listens for a harmonic of these frequencies as well as other frequencies near that harmonic.

In order to minimize or eliminate system-generated nonlinear products whose frequencies are the same as those intended to be received, which degrade signal to noise ratio and obscure responses of electronic targets, a preferred embodiment system comprises a low-pass filter before the transmit antenna, and a high-pass filter and a bank of band-pass filters for the harmonic filter. The signal-to-interference ratio of the preferred embodiment system is improved by increasing the out-of-band rejection for the high-pass filter and for the band-pass filters. The sensitivity of the preferred embodiment system is improved by narrowing the bandwidth of each band-pass filter.

A preferred embodiment multitone nonlinear radar system comprises a transmitter that transmits a signal comprising at least two predetermined frequency components; a receiver operating to receive return signals comprising harmonics of at least two predetermined frequencies, combinations of the at least two predetermined frequency components, and combinations of the harmonics of the at least two predetermined frequency components that are within a predetermined selected frequency range that has been predetermined to enable detection and/or classification of an electronic device; at least one antenna operating to transmit and receive electromagnetic radiation operatively connected to the transmitter and receiver; the receiver comprising at least one high pass filter for attenuating linear reflections at the two predetermined frequencies, and an analyzer; whereby electronic devices may be detected and identified by analyzing return signals within a predetermined frequency range.

Two frequency components of the preferred embodiment system may be represented by frequencies $f_1$ and $f_2$, and the combination and harmonics of $f_1$ and $f_2$ include combinations that may be represented by $Af_1$ and $Bf_2$, where A and B are positive and negative integer values selected so that the combination is within the predetermined selected frequency range.

Optionally, the preferred embodiment system may comprise a variable amplifier for amplifying the signal to be transmitted operatively connected to the transmitter. The amplifier operating to vary the amplitude of the at least two frequency components. Optionally, the system analyses the received signals by varying the amplitude of the at least two frequency components at a predetermined rate and detecting the rate of change in amplitude of the frequency components of the received signals. The system may be operated to detect electronics device that are capable of transmitting RF signals. The distance to the detected electronics device may optionally be determined by time of arrival of the return signals.

Optionally, the transmitter comprises a first filter that is tuned to provide transmission of signals having frequencies within a predetermined range and the transmitted signal may be a continuous wave in order to enable more power to be radiated on the targeted area for maximum detection. The analyzer may also measure the phase of the signal.

Optionally the predetermined selected frequency range of the return signal may be selected to maximize the response from a target based upon the emitting frequency of the target in the case of an RF emitting device. The system may optionally be used in conjunction with the operation of hospital medical equipment in order to avoid interference between unknown electronics devices and the medical equipment. In addition, the preferred embodiment system may be used in conjunction with the operation of a plane in order to avoid interference between the operation of detected electronics devices by the passengers and the operation of the plane's electronic equipment by the pilots.

Optionally, the preferred embodiment system may comprise a variable signal generator and an amplifier for amplifying the signal to be transmitted operatively connected to the transmitter that vary the amplitude and power of the at least two predetermined frequency components. The system may be operated to detect cellphones; based upon the combinations of the at least two predetermined frequency components, and combinations of the harmonics of the at least two predetermined frequency components that are within the predetermined selected frequency range. The analyzer analyses the amplitude and power of received signals, and by varying the power of the at least two frequency components and detecting the rate of change in amplitude of the frequency components of the return signals, a detected electronics device may be classified as a cellphone or radio.

Optionally, a preferred embodiment system may be employed using only a single antenna and operated so that the signals transmitted by the transmitter mix with the signals emitted by a target device to enable the generation and reception of mixing products centered on harmonics of the transmitted frequencies which may be received the single antenna. Optionally, the transmitter may comprise (1) a waveform generator as a source of the transmitted signal, (2) a step generator which adjusts the transmit signal power in at least approximately one decibel increments, (3) a low pass filter that attenuates system generated harmonics before amplification, and (4) an amplifier for amplifying the signal to be transmitted. Optionally, the step generator operates to vary the power of the transmitted signal, and the analyzer operates to detect how the harmonics change with varying transmitted power. When amplitudes of the returned signals are received at different transmit powers (which affects the signature of the electronic device), this enables the classification of the type of electronic device and a determination as to whether or not the electronic device is designed to transmit and receive information.

Optionally, the high pass filter or filters may comprise an adjustable high pass filter and the receiver may further comprise an amplifier operatively connected to the at least one adjustable high pass filter for passage of the harmonics at the predetermined selected frequency range and a plurality of band pass filters operatively connected to the amplifier, each of the plurality of band pass filters may be limited to reception of a selected harmonic or selected combination of the at least two frequency components or harmonics. Thus, the frequency range to be detected by the detector may be restricted to recording a single harmonic or combination of harmonics to reduce error and increase detection capability, while maximizing efficiency.

Optionally, the receiver may comprise a plurality of detectors, with each detector being operatively connected to a different one of the plurality of band pass filters. Thus, the detectors detect signals within a predetermined selected frequency range of the receiver to output a voltage dependent on the RF power received. Thus, the detector detects how a target responds to differently powered transmitted signals in correlation with the voltage of the detection circuitry to determine information concerning the target. Optionally, the analyzer comprises a classifier which classifies the detected harmonics as originating from different types of electronic devices, the classifier being operatively connected to the plurality of detectors.

Optionally, the preferred embodiment system analyzer comprises an algorithm which looks for patterns in the information and makes a decision as to the target type based on the patterns, the patterns comprising the transmit signal frequencies, the power of the transmit signal, the differences between the transmitted signal and the received return signals, the rate of variation of the transmit signal power and the rate of variation of the received signal power relative to the rate of variation of the transmit signal; all being used to determine the type of electronic device.

Optionally, the preferred embodiment system transmitter comprises at least two sine wave generators, each sine wave generator operating to transmit at a signal at a different predetermined frequency, a combiner for combining the signals at the least two predetermined frequencies operatively connected to the at least two sine wave generators, and a low pass filter operatively connected to the combiner.

Optionally the analyzer of the preferred embodiment system determines the type of electronic device detected using detection methodology based upon one of match filter, Bayesian decision theory, Generalized Likelihood Ratio Test, and constant false alarm rate processing to determine whether a nonlinearity is present. The analyzer may classify the type of electronic device detected using a classification method based upon one of Bayesian discriminate functions, nearest neighbor classifiers, support vector machines, neural networks, tree-based algorithms, and unsupervised learning algorithms for determining the type of RF device.

Optionally, the receiver is tunable to receive and process odd-order or even-order information, depending upon the harmonic to which the receiver is tuned.

A preferred method of practicing the present invention comprises:
providing a transmitter that transmits a signal comprising at least two predetermined frequency components;
providing a receiver operating to receive return signals comprising harmonics of at least two predetermined frequencies, combinations of the at least two predetermined frequency components, and combinations of the harmonics of the at least two predetermined frequency components that are within a predetermined selected frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies, and an analyzer;
whereby electronic devices may be detected and identified by analyzing return signals within a predetermined frequency range.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 2 is an illustration showing a plot of the data captures for two DUTs at $f_0$=756 MHz, corresponding to the first row of Table 1.

FIG. 3 is a is a schematic illustration of another preferred embodiment block diagram comprising, inter alia, a plurality of sine wave generators 1A-1C.

FIG. 5 illustrates a sample harmonic-radar return for M=2 (number of tones) and N=7, (number of harmonics) simulated in Matlab. T1 and T2 denote the two frequencies transmitted by the radar. R1 through R7 denote seven received frequencies that may be used to detect and classify the target.

FIG. 6 is a graphical illustration depicting a harmonic radar return where the number of transmitted tones is four (M=4).

FIG. 7 is a graphical illustration depicting a harmonic radar return where the number of transmitted tones is eight (M=8).

Figure 1A:
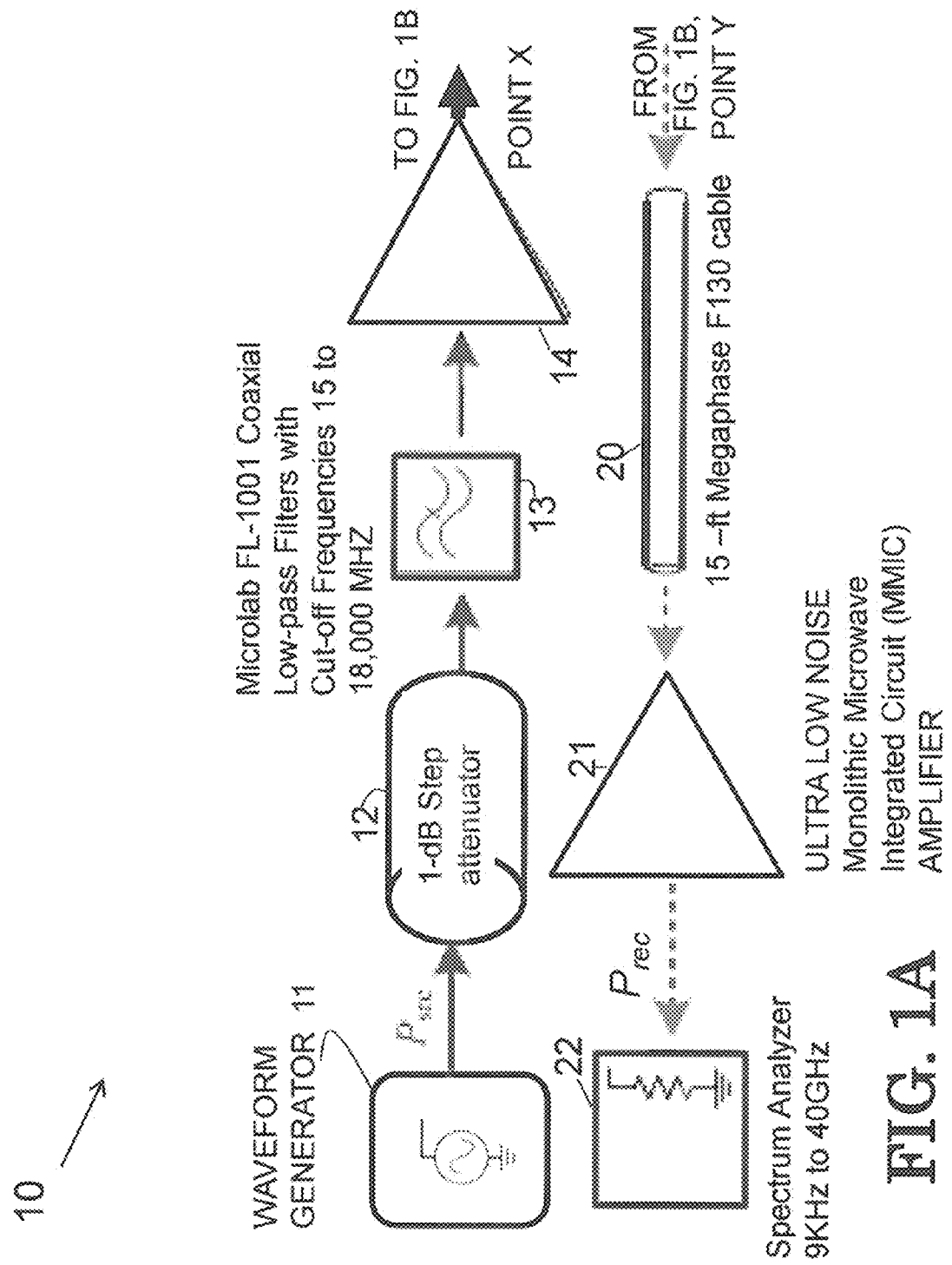
FIG. 1A is a schematic illustration of a preferred embodiment block diagram.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Several devices and methods exist for identifying electronics and other manmade objects using the nonlinear responses of metal and semiconductor junctions. The present invention has a number of advantages over these techniques: it enables a narrower-bandwidth antenna design while providing target information comparable to wider-bandwidth designs, it enables increased sensitivity and signal-to-interference ratio using three stages of filtering, and it allows a single-transmit-antenna design for generating and receiving mixing products ordinarily stimulated using multiple transmit antennas.

Receiving multiple harmonics requires the design of a broadband antenna or an antenna that is tunable to multiple harmonics. A preferred embodiment of the present invention tunes to a particular harmonic of the original frequencies, so that the receive antenna need only be designed to accommodate a bandwidth large enough to encompass the mixing products near that harmonic.

A preferred embodiment of the present invention uses a low pass filter before the transmit antenna, but it substitutes a high-pass filter and a bank of band-pass filters for the harmonic filter. The signal-to-interference ratio of the system is improved by increasing the out-of-band rejection for the high-pass filter and for the band pass filters. The sensitivity of the system is improved by narrowing the bandwidth of each band-pass filter.

Some prior art detectors tune to the harmonics of a single-frequency radar transmission. See for example, U.S. Pat. No. 3,732,567 to Low et al., herein incorporated by reference. Low discloses an apparatus for locating an electrically nonlinear object and determining the distance to the object by transmitting an FM signal in the vicinity of the nonlinear object causing a signal of a higher harmonic to be reflected by the nonlinear object. A receiver is provided for receiving the higher harmonic reflected signal and comparing such with the initial exciting signal so as to produce a signal, the amplitude of which is directly proportional to the distance to the object.

Receiving multiple harmonics requires the design of a broadband antenna or an antenna that is tunable to multiple harmonics. A preferred embodiment of the present invention tunes to a particular harmonic of the original frequencies; so that the receive antenna need only be designed to accommodate a bandwidth large enough to encompass the mixing products near that harmonic. Other detectors tune to the intermodulation produced by the interaction of multiple frequencies at the target. See, for example U.S. Pat. No. 6,765,527 to Jablonski, et al., herein incorporated by reference. These intermodulation products are a result of odd-order nonlinear interactions. The present invention is able to receive and process odd-order or even-order information, depending upon the harmonic to which the receiver is tuned. Some of the prior art devices attempt to eliminate system-generated nonlinear products whose frequencies are the same as those intended to be received. These system-generated products degrade the signal-to-interference ratio of the radar, lower its sensitivity, and obscure the responses of electronic targets. One approach for minimizing these products is to transmit a linearly-polarized beam from one antenna and receive the target information on an orthogonal polarization from a second antenna, as disclosed in U.S. Pat. No. 3,781,897 to Staras, et al., herein incorporated by reference. Another approach, for harmonics, is to use a low-pass filter just before the transmit antenna and a harmonic filter just after the receive antenna, as disclosed in U.S. Pat. No. 3,972,042 to Johnson, herein incorporated by reference. A popular approach for eliminating system-generated mixing products is to use a separate antenna for each transmit frequency.

Although the low-pass and high-pass filtering scheme of a preferred embodiment of the present invention does not allow for the reception of intermodulation, the present invention does enable the generation and reception of mixing products—centered on a harmonic of the transmit frequencies—using a single transmit antenna.

The present invention relates to, inter alia, radar technologies for detecting concealed threats. One technology that is well-suited for the detection of threats containing RF electronics is nonlinear radar, which exploits the electronic response from a target whose reflected frequencies are different from those transmitted. Reception of frequencies that are not part of the transmitted probe distinguishes the received signal from a linear return produced by clutter and indicates the presence of electronics. The presence of electronics in a location that typically does not contain electronics implies the presence of a threat.

A preferred embodiment is directed to a type of nonlinear radar that transmits multiple frequencies and listens for a harmonic of these frequencies as well as other frequencies near that harmonic. A preferred embodiment of the present invention comprises a multitone harmonic radar, a unique form of nonlinear radar, which detects and classifies radio-frequency (RF) electronic devices at standoff ranges. This preferred embodiment has several advantages over existing nonlinear radars: it enables a narrower-bandwidth antenna design while providing target information comparable to wider-bandwidth designs, it enables increased sensitivity and signal-to-interference ratio using multiple stages of filtering, and it allows a single-transmit-antenna design for generating and receiving mixing products that are usually stimulated from a target using multiple transmit antennas.

Nonlinear Radar

Nonlinear radar differs from traditional linear radar by offering high clutter rejection when detecting a variety of man-made targets. See in this regard, M. A. Flemming, et al., "Harmonic Radar Detection Systems," Proceedings of the IEE International Conference RADAR-77, pp. 1223-1231 (October 1977). Its disadvantage, compared to traditional linear radar, is that the power-on-target required to generate a comparable signal-to-noise ratio (SNR) is much higher. Nevertheless, nonlinear radar is particularly suited to the detection of devices containing metals and semiconductors that, while highly reflective, still possess a thin linear radar cross section.

Most nonlinear targets are not intended to respond to a nonlinear radar but do still respond because they contain electromagnetic nonlinearities inherent to their design, such as metal contacts, semiconductors, transmission lines, antennas, filters, connectors, and ferroelectrics. RF electronic devices such as handheld radios and cellular phones contain many of these nonlinear components.

A number of detection techniques have already been developed to exploit the nonlinear responses of RF electronics. One popular technique is to transmit a single frequency $f_0$ and receive the target response at the second harmonic of the transmitted tone, $2f_0$. Another technique is to transmit two tones $f_1$ and $f_2$ and receive the intermodulation tones $2f_1-f_2$ and $2f_2-f_1$. A preferred embodiment of the present invention transmits at least two tones and receives not only a harmonic of the transmitted tones (e.g. $2f_1$ and $2f_2$) but also the nonlinear products of those tones near that harmonic (e.g. $3f_1-f_2$, $f_1+f_2$, $3f_2-f_1$). This technique enables target discrimination using a narrow receiver bandwidth centered on a single harmonic. For example, to enable use with an antenna that transmits a powerful signal within a narrow band, first a signal range is selected based upon prior knowledge as to how certain electronic devices, such as cell phones, will respond to the transmitted signals. For instance, if the targeted electronic devices are cell phones, the predetermined selected frequency range will be a range in which return signal will enable identification of cellphones. For example, if two frequencies are used and the $\Delta f$ is approximately 40 kHz, the predetermined selected frequency range will be selected to enable return signals within the range of $Cf_1 \pm Df_2$, where C and D are integer values selected such that the combination is within the predetermined selected frequency range. For example, when the predetermined selected frequency range comprises return signals in the vicinity of $2f_1$ and $2f_2$, the return signals in the range include $(f_1+f_2)$, $(3f_1-f_2)$, $(3f_2-f_1)$, $(4f_1-2f_2)$, $(4f_2-2f_1)$, $(5f_2-3f_1)$, $(6f_2-4f_1)$, etc. Likewise, in the vicinity of $3f_1$ and $3f_2$, the return signals in the this predetermined selected frequency range include $(2f_1+f_2)$, $(4f_1-f_2)$, $(4f_2-f_1)$, $(5f_1-2f_1)$, $(5f_2-2f_1)$, $(6f_2-3f_1)$, $(7f_2-4f_1)$, etc. Moreover, the selection of the range of interest is narrow so as to permit the usage of a single, narrow-band antenna and usage of portable equipment that can transmit signals within the range and varying the power of the transmitted signals so as to enable detection and classification of the electronic device. A preferred method comprises varying the intensity or power of $f_1$ and $f_2$, and measuring the power or amplitude of the return signal components. Based upon the rate of the change in power or intensity of $f_1$ and $f_2$, and the relative change in the amplitude of the frequency components of the return signals, the type of electronic device can be determined, such as for example a cell phone. The method and device can be used in medical facilities to determine whether or not cell phones are being operated in the vicinity of medical equipment susceptible to interference from cellphones. Upon detection of a cell phone, the operators of the medical equipment may be alerted and the cell phone user told to remove the cell phone. As another example, the method and device may be utilized aboard an airline where the planes equipment is susceptible to interference from cellphones and/or internet devices such as laptops, tablets, etc. Using the device to detect such electronic devices may avoid interference with the plane's electronics during, for example, take-off or landing of the plane.

Experiments conducted focused on the second harmonic of the transmitted tones because that harmonic tends to be the strongest of the received harmonics for the RF devices-of-interest to this study. A preferred method is utilized for discriminating between devices, using at least two transmitted tones.

Harmonic Radar Theory

A harmonic radar is a radio-frequency (RF) sensor that exploits the nonlinear electromagnetic response of a target to an incident radar wave. The transmitted linear radar waveform contains a known set of frequencies:

$F_1 = \{f_1, f_2, f_3, f_4, f_5 \ldots\}$

When this transmission illuminates a target containing nonlinear electromagnetic properties, the original waveform is distorted. This distortion produces a reflected waveform whose frequencies span the set of integer multiples, sums, and differences of the original frequencies:

$$F_R = \left\{ \sum_{i=1}^{M} m_i f_i ; m_i \in \mathbb{Z} \right\}.$$

Integer multiples of the original frequencies (e.g. $2f_1, 3f_1, 4f_1$) are harmonics. All other integer sums are mixing products. Those mixing products that are nearest to the original tones (e.g. $2f_1-f_2$, $2f_2-f_1$) are intermodulation.

Many physical sources of nonlinear electromagnetic distortion have been identified. See in this regard, U.S. Pat. No. 7,830,299, herein incorporated by reference. Small threats are typically very difficult to detect since they are of low radar cross-section, may be slow moving, or perhaps static, and may be situated in an environment of clutter interference. For example, of importance is the detection of electronic hardware or circuits associated with small classes of weapons and unmanned vehicles. This is especially true in the detection of small UAV systems. In such circumstances, conventional radars that depend upon primary (or direct mirror-like) radio reflections of their transmitted wave forms are relatively non-effective detectors of man-made devices and of such threats. In a conventional radar system, difficulty arises when increasing the illuminating signal power and correspondingly the energy returned from such objects within a radar beam to achieve improved transmission/range. RF electronics contain several of these nonlinear electromagnetic distortion sources, such as semiconductor junctions, metal-metal contacts, and antennas. Clutter objects in rural and desert environments generally do not contain sources of electromagnetic nonlinearity, with the exception of ferromagnetic materials. By transmitting a known set of frequencies into such an environment and listening for frequencies that are not part of the original probe set, the presence or absence of RF electronics in that environment may be determined. If frequencies different from the original transmission are received by the radar, the presence of RF electronics is implied.

To predict the reflected response of an electronic device to incident RF radiation, a memoryless Taylor series model is assumed for nonlinearity:

$$E_{refl}(t) = \sum_{p=1}^{\infty} a_p E_{in}^p(t) \qquad (1)$$

where $E_{in}$ is the electric field incident on the device-under-test (DUT), $a_p$ are complex power-series coefficients, and $E_{refl}$ is the electric field reflected by the device.

Each term inside the infinite sum is $$E_m(t) = a_m E_{in}^m(t). \qquad (2)$$

In the frequency domain, $E_1$ and $E_2$ are $$\tilde{E}_1(f) = a_1 \tilde{E}_{in}(f) \qquad (3)$$

$$\tilde{E}_2(f) = a_2 [\tilde{E}_{in}(f) * \tilde{E}_{in}(f)] = \frac{a_2}{a_1} [\tilde{E}_{in}(f) * \tilde{E}_1(f)].$$

where $E_2$ was computed from $E_1$ by convolution of $E_1$ with the input field $E_{in}$. Likewise, the result for each successive $E_m(f)$ may be computed by the recursive convolution of $E_{m-1}(f)$ with $E_{in}(f)$:

$$\tilde{E}_m(f) = \frac{a_m}{a_{m-1}} [\tilde{E}_{in}(f) * \tilde{E}_{m-1}(f)]. \qquad (4)$$

For a single-tone sinusoidal input with frequency $f_0$ and amplitude $E_0$, $$\tilde{E}_{in}(f) = \frac{E_0}{2} [\delta(f - f_0) + \delta(f + f_0)], \qquad (5)$$

the electric field reflected from the device computed using (4) is $$\tilde{E}_{refl}(f) = \sum_{M=1}^{\infty} \frac{E_M}{2} [\delta(f - Mf_0) + \delta(f + Mf_0)] \qquad (6)$$

$$E_M = \sum_{k=1}^{\infty} \binom{2k+M-2}{k-1} \frac{a_{2k+M-2}}{2^{2k+M-3}} E_0^{2k+M-2}.$$

This result, converted back into the time domain, is $$E_{refl}(t) = \sum_{M=1}^{\infty} |E_M| \cos(2\pi \cdot Mf_0 \cdot t + \phi\{E_M\}) \qquad (7)$$

which is a sum of sinusoids at harmonics $M$ of $f_0$, each with amplitude $|E_M|$ and phase $\phi\{E_M\}$. If, instead of a single probe tone, two simultaneous sinusoids $f_1$ and $f_2$ are transmitted, the electric field incident upon the DUT is $$\tilde{E}_{in}(f) = \frac{E_0}{2\sqrt{2}} [\delta(f - f_2) + \delta(f - f_1) + \delta(f + f_1) + \delta(f + f_2)]. \qquad (8)$$

The amplitudes of both sinusoids is $E_0/\sqrt{2}$ such that the total signal power in the two-tone waveform is the same as the power of the single-tone waveform given by (5). The reflected electric field computed using (4) is then $$\tilde{E}_{refl}(f) = \sum_{P=1}^{\infty} \sum_{Q=1}^{\infty} \frac{E_{PQ}}{2} [\delta(f - Pf_1 - Qf_2) + \delta(f + Pf_1 + Qf_2)] \qquad (9)$$

$$E_{PQ} = \sum_{k=1}^{\infty} \binom{2k+P+Q-2}{k-1} \qquad (10)$$

$$\binom{2k+P+Q-2}{k+Q-1} \left(\frac{a_{2k+P+Q-2}}{2^{2k+P+Q-3}}\right) \left(\frac{E_0}{\sqrt{2}}\right)^{2k+P+Q-2}.$$

P and Q are integers that allow (9) to span all the possible frequency combinations produced by repeatedly multiplying pairs of sinusoids together. If only the two strongest electric-field components from (10) are considered (k=1, 2), the amplitudes of the reflected tones are $$E_{PQ} = \binom{P+Q}{Q} \frac{a_{P+Q}}{2^{P+Q-1}} \left(\frac{E_0}{\sqrt{2}}\right)^{P+Q} + \qquad (11)$$

-continued $$\binom{P+Q+2}{1}\binom{P+Q+2}{Q+1}\left(\frac{a_{P+Q+2}}{2^{P+Q+1}}\right)\left(\frac{E_0}{\sqrt{2}}\right)^{P+Q+2}.$$

Let $f_0=(f_1+f_2)/2$ and $\Delta f=f_2-f_1$. Near $2f_0$ (P+Q=2), (11) simplifies to $$E_{PQ} = \binom{2}{Q}\frac{a_2}{4}E_0^2 + \binom{4}{Q+1}\frac{a_4}{8}E_0^4. \quad (12)$$

For tones separated from $2f_0$ by $\Delta f$, $Q\in\{0, 1, 2\}$, the first term of (12) dominates as $E_0 \to 0$ (i.e. at standoff range, well below device saturation). The reflected power density—related to the amplitude of the electric field as $P_D=E^2/2\eta$ where $\eta$ is the wave impedance—is $$P_{D,refl}(Pf_1 + Qf_2) = \binom{2}{Q}^2\frac{|a_2^2|}{32}\frac{E_0^4}{\eta}. \quad (13)$$

The amplitude of the spectral content at $2f_0$ and at $2f_0\pm\Delta f$ is governed by the DUT parameter $a_2$. The ratio of $P_D$ reflected at the $2^{nd}$ harmonic tones (P=0, Q=2) to $P_D$ reflected at the sum tone (P=1, Q=1) is −6 dB. This ratio is the same regardless of the value of $a_2$ or the value of any other device parameter $a_p$.

For tones separated from $2f_0$ by $2\Delta f$, $Q\in\{-1, 3\}$, the first term of (12) is zero and the reflected power density at $2f_0\pm2\Delta f$ is $$P_{D,refl}(Pf_1 + Qf_2) = \frac{|a_4^2|}{128}\frac{E_0^8}{\eta}. \quad (14)$$

The spectral content at $2f_0\pm2\Delta f$ is governed by the DUT parameter $a_4$. Extension of (12) to include k=3, 4, etc. shows that the spectral content at $2f_0\pm3\Delta f$ is governed by as, the spectral content at $2f_0\pm4\Delta f$ is governed by $a_5$, and so on. Since the coefficients $a_p$ are device-dependent, the set of nonlinear products received at different multiples of $\Delta f$ away from $M\cdot f_0$ between different DUTs provides a way to distinguish nonlinear DUTs from each other.

PREFERRED EMBODIMENTS

Figure 1B:
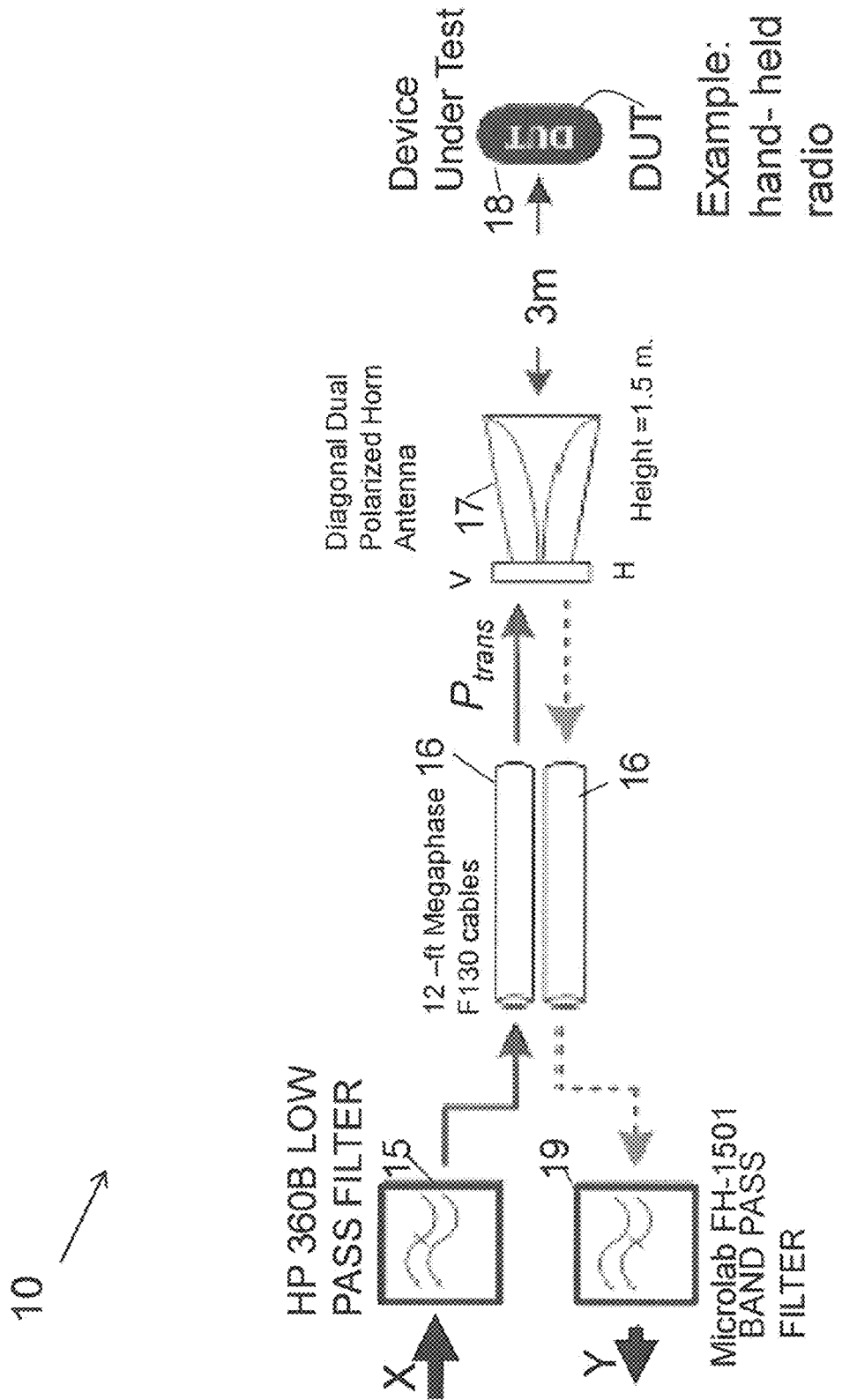
FIG. 1B is a schematic illustration showing a continuation of the preferred embodiment block diagram of FIG. 1A.

The architecture of preferred embodiment two-tone harmonic radar is given in FIGS. 1A and 1B, which, when combined, illustrate a single electronics circuit. Shown in FIG. 1A is a waveform generator 11 which is used as a signal source. The waveform generator may be for example, a Tektronix AWG7052 arbitrary waveform generator. A step attenuator 12 is used to adjust the transmit signal power in 1-dB increments. A low pass filter 13, such as, for example, the Microlab FL-1001 low pass filter, attenuates system-generated harmonics before amplification. Amplifier 14, such as for example, the Amplifier Research 10W1000 amplifier, boosts the transmit signal to a level sufficient to generate a nonlinear response from the DUT. A low pass filter 15, such as, for example, the Hewlett Packard 360B low pass filter, attenuates system-generated harmonics after amplification. The transmit signal is fed to the "vertical" polarization of an antenna 17, such as the ETS Lindgren 3164-03 dual-polarized horn antenna, through a cable 16, such as, for example, a 12-ft low-distortion Megaphase F130 cable. In the experimental set-up of a preferred embodiment shown in FIGS. 1A-1B, the horn antenna 17 is placed at a height of 1.5 meters and turned 45° to the DUT 18. As shown schematically in FIG. 1B, the DUT 18 stands vertically and faces the antenna 17.

The "horizontal" polarization of the antenna receives the reflected DUT 18 response. A band pass filter 19, which can be for example, a Microlab FH-1501 filter, attenuates linear reflections at the transmit frequency while passing the harmonic reflections. A 15 ft. Megaphase F130 cable connects to a low noise amplifier 21, which may be for example a MiniCircuits PSA-545+ low-noise amplifier, boosts the received signal for capture by the analyzer 22, which may be, for example, a Rohde & Schwarz FSP-40 spectrum analyzer. An appropriate resolution bandwidth for the spectrum analyzer is 100 Hz.

Table 1 provides the results of a two-tone radar test conducted at three transmit frequencies $f_0$=756, 778, 802 MHz, and using two different DUTs: the Motorola T4500 and Motorola FV200 handheld radios. The transmit power was set to $P_{trans}$=31 dBm per tone (approximately 2.5 W total). Each pair of transmitted tones was separated by $\Delta f$=40 kHz. The power received $P_{rec}$ was recorded at $2f_0$, $2f_0\pm\Delta f$, and $2f_0\pm2\Delta j$, and compared between the DUTs.

TABLE 1

Two-tone harmonic radar data: DUTs = Motorola T4500 and Motorola FV200, $\Delta f$ = 40 kHz, $P_{trans}$ = 31 dBm per tone. $P_{rec}$ at $2f_0 \pm \Delta f$ is approximately −6 dBc for both DUTs, which is predicted by (13). $P_{rec}$ at $2f_0 \pm 2\Delta f$ differs between the DUTs, by as much as 11.5 dB depending upon the transmitted frequency.

| $f_0$ | $P_{rec}$ at $2f_0$, T4500 (dBm) | $P_{rec}$ at $2f_0$, FV200 (dBm) | $\Delta P_{rec}$ at $2f_0$ (dB) | $P_{rec}$ at $2f_0 \pm \Delta f$, T4500 (dBc) | $P_{rec}$ at $2f_0 \pm \Delta f$, FV200 (dBc) | $\Delta P_{rec}$ at $2f_0 \pm \Delta f$ (dB) | $P_{rec}$ at $2f_0 \pm 2\Delta f$, T4500 (dBc) | $P_{res}$ at $2f_0 \pm 2\Delta f$, FV200 (dBc) | $\Delta P_{rec}$ at $2f_0 \pm 2\Delta f$ (dB) |
|---|---|---|---|---|---|---|---|---|---|
| 756 MHz | −71.2 | −81.5 | 10.3 | −6.4 | −5.7 | −0.7 | −20.7 | −32.2 | 11.5 |
| 778 MHz | −81.2 | −74.1 | −7.1 | −6.4 | −5.9 | −0.5 | −31.4 | −27.9 | −3.5 |
| 802 MHz | −87.9 | −71.9 | −16.0 | −6.2 | −6.4 | +0.2 | −30.5 | −26.6 | −3.9 |

FIG. 2 is a plot of the data captures for $f_0$=756 MHz. Specifically, FIG. 2 illustrates the nonlinear response recorded from two DUTs at $f_0$=756 MHz, corresponding to the first row of Table 1.

From Table 1 and FIG. 2, three results are noteworthy: First, $P_{rec}$ at $2f_0$ between the two DUTs can differ by more than 15 dB, which means that the strengths of the radar returns from two different nonlinear devices (of the same type) illuminated by the same frequency at the same position and in the same orientation can vary by more than an order of magnitude.

Second, $P_{rec}$ at $2f_0 \pm \Delta f$ is consistently 6 dB below $P_{rec}$ at $2f_0$ for a particular device and different transmit frequencies. This result matches well with the ratio derived from (13).

Third, $P_{rec}$ at $2f_0 \pm 2\Delta f$ varies by more than 10 dB between different devices, depending upon the transmit frequencies.

Although the difference in the peak of the nonlinear response at $2f_0$ implies a difference between $a_2$ of the two DUTs in this test, a fielded radar may not be able to distinguish between the difference in response caused by propagation loss or other factors that depend on the emplacement of the target versus the difference in response caused by the target property $a_2$. The difference between the peak response at $2f_0$ and the response at $2f_0 \pm 2\Delta f$, however, depends strongly on the relative levels of the target properties $a_2$ and $a_4$ and is thus a more robust discriminator between two targets.

Although target discrimination is possible by transmitting a single tone $f_0$ and forming a device signature from the received amplitudes of several harmonics, reception of such a frequency set requires either a wideband receive antenna or an antenna that is tunable to each harmonic. Transmitting two closely-spaced tones ($\Delta f < 1$ MHz) and receiving the mixing products near $2f_0$ removes this requirement. Using the proposed two-tone target discrimination scheme, the receive antenna need only be designed to operate in a narrow band centered at $2f_0$.

Referring now to FIG. 3, a block diagram of the multitone harmonic radar, which comprises a transmitter 30 and a receiver 40, which, although shown side-by-side, may be separated. One of ordinary skill in the art would appreciate that portions transmitter 30 and receiver 40 could be integrated together.

Inside the transmitter 30 are sine-wave generators 11A-11C, a combiner 23, an amplifier 14A, a low-pass filter 15, and an antenna 17T. The M sine-wave generators 11A, 11B and 11C produce each of the M frequencies that comprise the RF transmission. The transmitted frequencies are contained within a bandwidth B and this bandwidth is centered on a frequency fc. The transmitted frequencies are spaced close enough to each other so that they may be efficiently transmitted by a single antenna (17T), but they are spaced far enough away from each other so that the reflected frequencies may be filtered and passed individually (by a bank of filters, in the receiver). The M-port combiner 23 splices the frequencies of sine wave generators 11A, 11B & 11C together into one RF wave. The amplifier 14A boosts the power of the wave before transmission. The low-pass filter 15 achieves a reduction in system-generated harmonics by attenuating frequencies at the output of the amplifier 14A that are well above the highest transmitted freq $f_M$. The antenna 17T broadcasts the RF transmission into the environment of interest Inside the receiver 40 are an antenna 17R, a high-pass filter 19, a low-noise amplifier 20 (LNA), a bank of band-pass filters 21, a bank of detectors 22, and a classifier 23. The antenna 17R receives the RF reflections from the environment; it is tuned to a particular harmonic of the transmitted frequencies, $\alpha f_c$ ($\alpha = 2, 3, 4, \ldots$). The high-pass filter 19 achieves a reduction in system-generated harmonics by attenuating frequencies received by the antenna that are well below the lowest transmitted frequency $f_1$. The LNA 20 boosts the received signal to a level that is adequate for the detectors 22 and classifier 23. Each band-pass filter 21 is tuned to a different integer-multiple sum of the transmitted frequencies and passes that particular frequency to its detector 22. The band-pass filters 21 can be narrow (<100 kHz) for high receiver sensitivity. The detectors 22 register the amplitude of each received frequency and indicate the presence or absence of a nonlinear target if the received amplitude exceeds a given threshold. The classifier 23 compares the set of received amplitudes against amplitude information collected from nonlinear targets (prior to the in-situ data collection) and indicates a match if one is found.

FIG. 5 shows a sample harmonic-radar return for M=2 and N=7, simulated in Matlab. T1 and T2 denote the two frequencies transmitted by the radar. R1 through R7 denote seven received frequencies that may be used to detect and classify the target. In general, the multitone electric field input to the target Ein may be written in the time domain $$E_{in}(t) = \sum_{i=1}^{M} E_i \cos(2\pi f_1 t - \phi_1) \tag{3A}$$

and in the frequency domain $$\tilde{E}_{in}(f) = \frac{1}{2} \sum_{i=1}^{M} E_i e^{i\phi} [\delta(f - f_1) + \delta(f + f_1)]. \tag{4A}$$

A simple mathematical model assumed for an electronic target illuminated by RF power is that of a memory less nonlinearity:

$$E_{refl}(t) = \sum_{j=1}^{K} a_j E_{in}^j(t) * h(t) \tag{5A}$$

where $E_{refl}(t)$ is the electric field reflected by the device, $a_j$ are complex power series coefficients, and $h(t)$ is a linear response term that accounts for any gain/filtering imparted onto the target response immediately after the nonlinear interactions. The value of $a_1$ is the linear response of the target; the values of $a_2$ through $a_K$ depend upon the nonlinearities of the target.

For an input waveform with M=2, $E_1 = E_2$ and $\phi_1 = \phi_2 = \phi_0$, (3) becomes $$E_{in}(t) = E_0\{\cos(2\pi f_1 t) + \cos(2\pi f_2 t)\}. \tag{6A}$$

Substituting (6A) into (5A) and assuming that (at least) the terms $a_2$, $a_4$, and $a_6$ are non zero yields $$E_{refl}(t) = \tag{7A}$$

$$\begin{Bmatrix} \frac{a_2}{2} E_0^2 \{\cos[2\pi(2f_1)t] + 2\cos[2\pi(f_1+f_2)t] + \cos[2\pi(2f_2)t]\} + \\ \frac{a_4}{8} E_0^4 \{4\cos[2\pi(3f_1-f_2)t] + 4\cos[2\pi(3f_2-f_1)t]\} + \\ \frac{a_6}{32} E_0^6 \{15\cos[2\pi(4f_1-2f_2)t] + 15\cos[2\pi(4f_2-2f_1)t]\} + \ldots \end{Bmatrix} * h(t)$$

which in the frequency domain becomes $$|\tilde{E}_{in}(f)| = \frac{a_2}{4} E_0^2 \cdot \begin{Bmatrix} |H(2f_1)| \cdot \delta[f-(2f_1)] + \\ 2|H(f_1+f_2)| \cdot \delta[f-(f_1+f_2)] + \\ |H(2f_2)| \cdot \delta[f-(2f_2)] \end{Bmatrix} + \tag{8A}$$

-continued $$\frac{a_4}{16}E_0^4 \cdot \left\{ \begin{array}{l} |H(3f_1 - f_2)| \cdot \delta[f - (3f_1 - f_2)] + \\ |H(3f_2 - f_1)| \cdot \delta[f - (3f_2 - f_1)] \end{array} \right\} +$$

$$\frac{a_6}{64}E_0^6 \cdot \left\{ \begin{array}{l} |H(4f_1 - 2f_2)| \cdot \delta[f - (4f_1 - 2f_2)] + \\ |H(4f_2 - 2f_1)| \cdot \delta[f - (4f_2 - 2f_1)] \end{array} \right\} + \ldots$$

where $|H(f)|$ is the magnitude of the frequency-domain equivalent of h(t). These seven frequency-domain peaks correspond to the "target reflection" points R1 . . . R7 in FIG. 5.

The power-series coefficients $a_1$ . . . $a_K$ and the transfer function H(f) vary between different devices; thus, the amplitudes of the tones received at $2f_1$, $2f_2$, etc. vary between different devices. The received tone amplitudes at these frequencies are a signature that may be assigned to each target-of-interest.

Additional tones may be used to generate more unique information about each target. FIGS. 6 and 7 illustrate the received spectral content for radar transmissions containing 4 and 8 tones, respectively. In FIG. 6 there are 19 received frequencies (spanning a2, a4, a6, . . . , a18) and in FIG. 7 there are 41 points of information (spanning $a_2$, $a_4$, $a_6$, . . . , $a_{40}$).

The multi-tone approach generates the key information or features, in the target needed for identification. Detection and classification of these features is therefore generalized to standard methodologies. Common target detection methodologies include match filter, Bayesian decision theory, Generalized Likelihood Ratio Test (GLRT), and constant false alarm rate (CFAR) processing as described in E. Axell, et al., "Spectrum Sensing for Cognitive Radio," *IEEE Signal Processing Magazine*. Vol. 29. No. 3, pp. 101-116 (May 2012) herein incorporated by reference. Once the features are detected, they are classified to identify a target type (i.e. model of the RF device). Common classification methodologies include Bayesian discriminate functions, nearest neighbor classifiers, support vector machines (SVM), neural networks, tree-based algorithms, and unsupervised learning algorithms.

Figure 4:
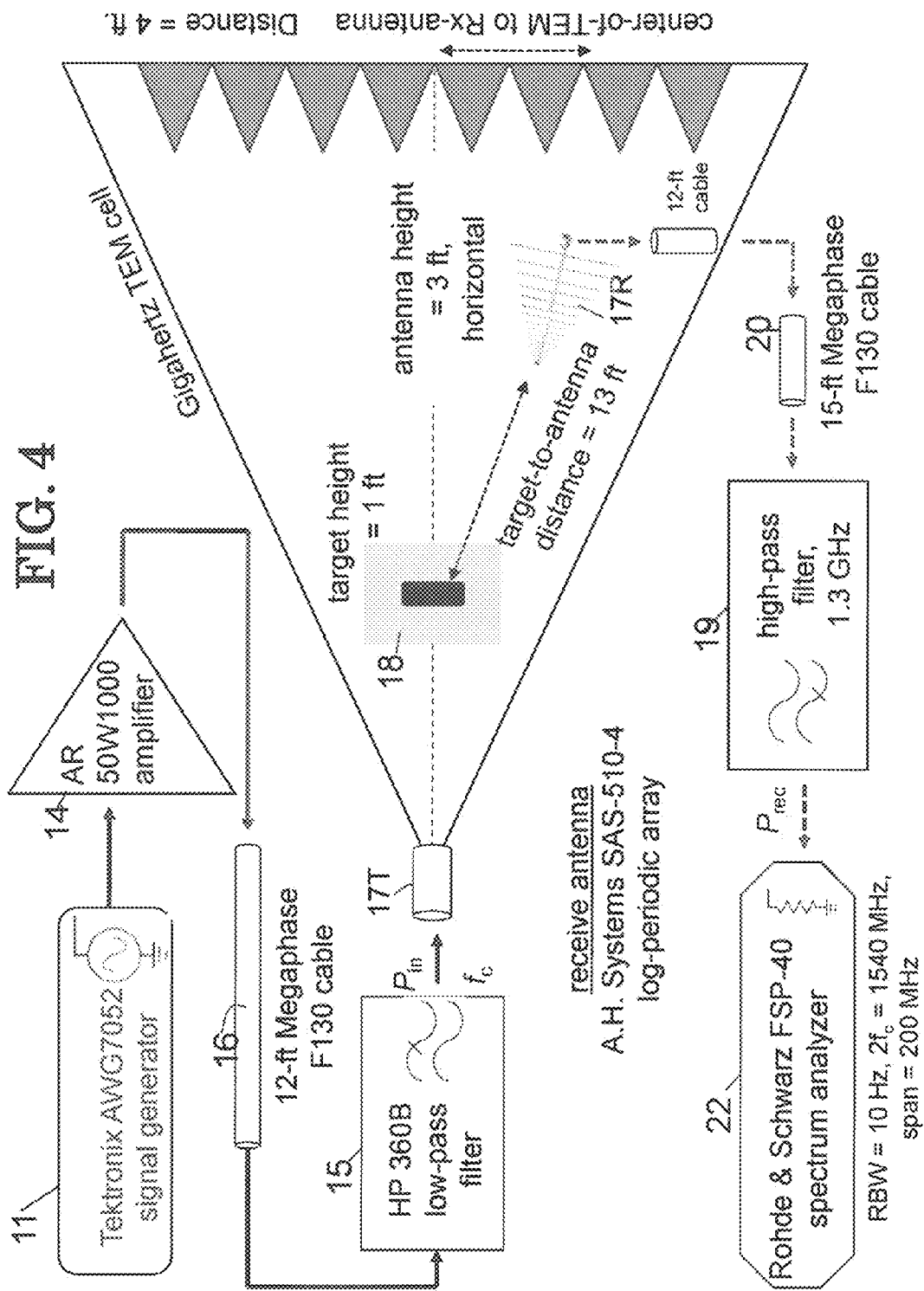
FIG. 4 is a is a schematic illustration of another preferred embodiment block diagram comprising, inter alia, a detached receiving antenna 17R.
Figure 8B:
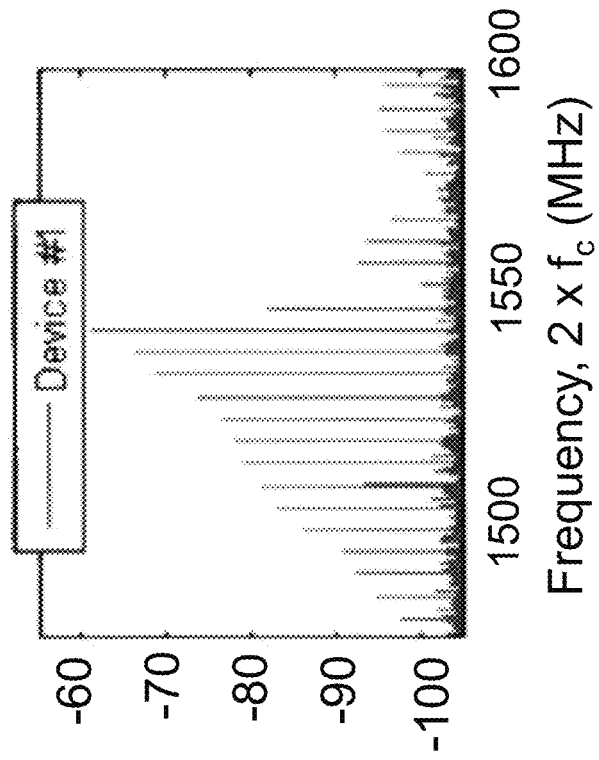
FIG. 8B is a graphical illustration depicting a harmonic radar return where M equals 2 tones with a first target device.
Figure 8A:
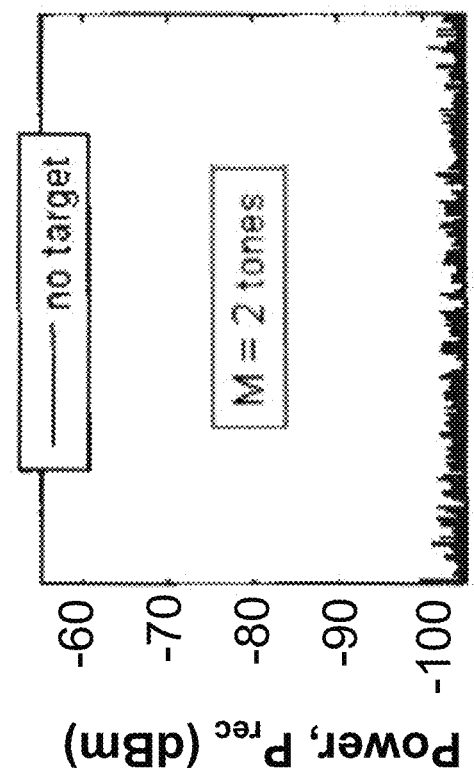
FIG. 8A is a graphical illustration depicting a harmonic radar return where the number of transmitted tones (M) equals 2 with no target.
Figure 8C:
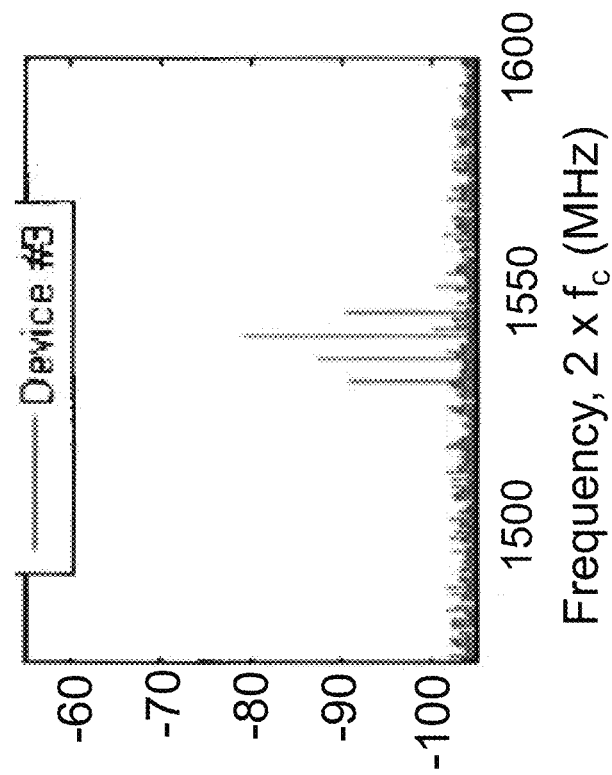
FIG. 8C is a graphical illustration depicting a harmonic radar return where M equals 2 tones with a second target device.
Figure 8D:
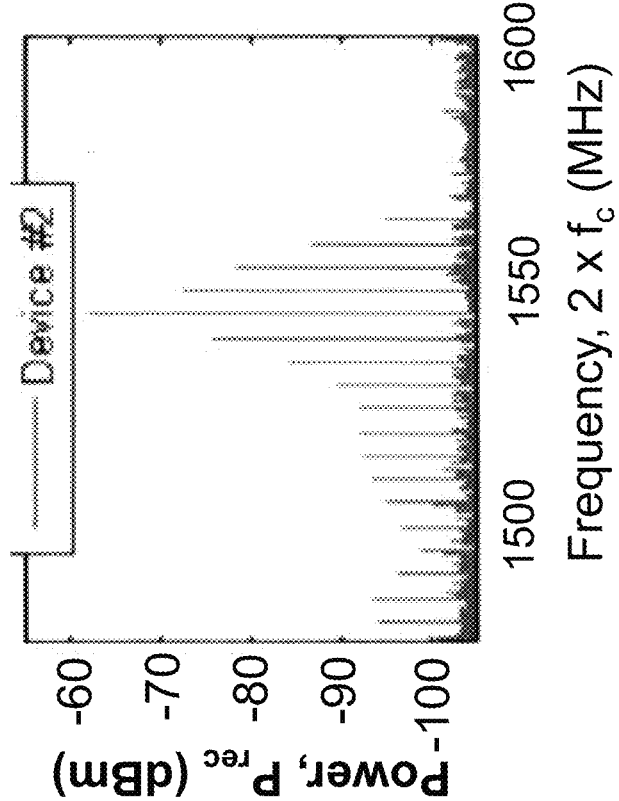
FIG. 8D is a graphical illustration depicting a harmonic radar return where M equals 2 tones with a third target device.

A preferred embodiment constructed at the Army Research Laboratory demonstrated the multitone radar concept as depicted in FIG. 4. The Tektronix AWG7052 signal generator 11 outputs two combined simultaneous frequencies (M=2). These tones are centered on fc=770 MHz and are separated by $f_{sep}$=5 MHz, although the invention is not limited to the selection of these tones or this number of tones. In the example, the frequencies have equal amplitudes (−6 dBm per tone). The Amplifier Research AR50W1000 amplifier 14 increases the multi tone signal power by approximately 50 dB. The HP 360B low-pass filter 15 rejects frequencies above 1200 MHz. Megaphase F 130 low-distortion cable 16 minimizes system-generated nonlinear spectral content.

The multitone waveform is applied to the output of a Gigahertz Transverse Electromagnetic (GTEM) cell, which is a large waveguide capable of applying transverse EM waves with a nearly-vertical electric field to the samples inside of it. A target sits on a 1-foot-high block of foam. The receiver antenna, the A. H. Systems SAS-510-4 log-periodic array, faces the target, 13 feet away from it. The antenna 17R sits on a 3-foot-high tripod.

The received signal is fed to a high-pass filter which rejects frequencies below 1300 MHz. The Rohde & Schwarz FSP-40 spectrum analyzer 22 functions as the filter-bank and detector. The resolution bandwidth (RBW) of the analyzer is set to 10 Hz to illustrate the sensitivity that can be achieved using a bank of 10-Hz band-pass filters in the receiver.

Data from which detection and classification are possible is shown in FIGS. 8A-8D. Multitone responses were collected from three RF electronic targets. A comparison of the responses, as well as the received signal from the "no target" case (i.e. when there is no device on the block of foam) is possible (see FIG. 8A).

From FIGS. 8A-8D, detection can be made visually. For example, the detection threshold can be set to −100 dBm at a received frequency of 1540 MHz. Reception of a device response above this threshold (e.g. −62 dBm for Device #1, −62 dBm for Device #2, or −80 dBm for Device #3) registers a detection for all three targets. As the shapes of the received spectra (illuminated by the same waveform, at the same power, and observed at the same standoff distance) are different between the targets, a signature may be assigned to each target. One possible basis for this signature is a pairing between received frequency and received amplitude.

The advantages of multitone harmonic radar, as utilized in the preferred embodiments disclosed herein, as compared to existing nonlinear radars, are as follows:

(1) It enables a narrower-bandwidth front-end design (antenna) while providing target information comparable to wider-bandwidth designs.

(2) It provides high sensitivity and high signal-to-interference ratio when implemented using multiple stages of filtering.

(3) It allows a single-transmit-antenna design for generating and receiving nonlinear products that are usually (ordinarily) stimulated from a target using multiple transmit antennas. Since the preferred embodiments of the present invention tune to a particular harmonic of the original frequencies, the receive antenna need only be designed to accommodate bandwidth large enough to encompass the mixing products near the harmonic; i.e., the receive antenna need only be designed to accommodate a bandwidth large enough to encompass the nonlinear products near that harmonic.

Some nonlinear detectors tune to the harmonics of a single-frequency radar transmission to perform device discrimination. Receiving multiple harmonics requires the design of a broadband antenna or an antenna that is tunable to multiple harmonics In the preferred embodiments described herein system-generated nonlinear products whose frequencies are the same as those intended to be received are reduced or eliminated. These system-generated products degrade the signal-to-interference ratio of the radar, lower its sensitivity, and obscure the responses of electronic targets. Although the low-pass and high-pass filtering scheme does not allow for the reception of intermodulation, the present invention does enable the generation and reception of mixing products—centered on a harmonic of the transmit frequencies—using a single transmit antenna.

In addition to orthogonal polarizations, the preferred embodiment multitone radar of FIGS. 1A-1B implements a low pass filter before the transmit antenna and a high pass filter after the receive antenna. The signal-to-interference ratio of the system is improved by increasing the out-of-band rejection for these filters. To achieve high sensitivity, a bank of band pass filters can be inserted in the receive chain after the high pass filter, each tuned to one of the desired harmonic tones (e.g. $2f_0$, or $2f_0-2\Delta f$).

Although the low pass and high pass filtering scheme presented here does not allow for the reception of intermodulation, it does enable the exploitation of target-generated nonlinear products and the elimination of system-generated nonlinear products using a single transmit antenna.

The difference in signal strengths between different devices recorded at the same frequency interval away from the $2^{nd}$ harmonic (and illuminated by the same transmit power and the same transmit frequencies, in the same position and orientation) provides a way to distinguish between those devices.

Other detectors tune to the intermodulation produced by the interaction of multiple frequencies at the target. These intermodulation products are a result of odd-order nonlinear interactions. The preferred embodiments of the present invention are able to receive and process odd-order or even-order information, depending upon the harmonic to which the receiver is tuned.

A preferred embodiment of the present invention may be used for finding weapons and ordnance, tracking moving manmade objects, tracking tags that are placed on moving objects, locating enemy radios and phones, performing counter-surveillance, tracking tagged insects and animals, locating people during emergencies, locating devices whose electromagnetic emissions exceed legal limits, avoiding automobile collisions, and monitoring vital signs of humans.

As used herein, the terminology harmonic radar means a radio frequency sensor that exploits the nonlinear electromagnetic response of a target to an incident radar wave.

As used herein, the terminology "high pass filter" or "high-pass filter" or "highpass filter" means an electronic filter that passes high-frequency signals but attenuates or reduces the amplitude of signals with frequencies lower than the cutoff frequency.

As used herein the terminology "low pass filter" or "low-pass filter" or "lowpass filter" means an electronic filter that passes low-frequency signals and attenuates or reduces the amplitude of signals with frequencies higher than a cutoff frequency.

As used herein the terminology "band pass filter" or "band-pass filter" or "bandpass filter" means an electronic filter that is a combination of a low-pass and a high-pass; i.e. it attenuates or reduces the amplitude of signals with frequencies higher than a first cutoff frequency and lower than a second cutoff frequency.

As used herein the terminology "harmonic" as it relates to the frequency of a signal or signals comprises frequency components of a signal or signals that are integer multiples of the fundamental frequencies, such as, for example, if the fundamental frequency is f, the harmonics have frequencies of 2f, 3f, 4f, 5f, 6f . . . etc.

As used herein the terminology "frequency of interest" is a frequency range at which it has been predetermined that the return signals may enable detection of an electronic device or produce fluctuations of power or intensity that enable identification of an electronic device Obviously, many modifications and variations of the present invention are possible in light of the above teachings. It is therefore to be understood that, within the scope of the appended claims, the invention many be practiced otherwise than as specifically described.

The invention claimed is:

1. A multitone nonlinear radar system comprising:
a transmitter that transmits a signal comprising at least two predetermined frequency components of varying intensity and/or power;
a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies, and
an analyzer configured to detect how the harmonics change with varying transmitted power;
whereby electronic devices may be detected and identified based upon the rate of change of measured power or intensity of the return signal components and wherein amplitudes that are received at different transmit powers in effect provide a signature for the electronic device that enable classification as to the type of electronic device and whether or not the electronic device is designed to transmit and/or receive information.

2. The system of claim 1 wherein the at least two predetermined frequency components may be represented by frequencies $f_1$ and $f_2$, and the combination and harmonics of $f_1$ and $f_2$ comprise combinations that may be represented by $Af_1$ and $Bf_6$, where A and B are positive and negative integer values selected so that the combination is within the predetermined frequency range and wherein the nonlinear products of frequencies near that harmonic are utilized such as $Af_1-f_2$, $f_1+f_2$, $Bf_2-f_1$ to enable target discrimination using a narrow receiver bandwidth.

3. The system of claim 1 wherein the range of the detected electronics device from the transmitter is determined by the difference between the time of transmission of the transmitted signal and the time of arrival of the return signals, and wherein the direction to the detected electronic device is determined by the direction of the at least one antenna which maximizes the return signals for the at least two predetermined frequencies and a fixed transmit power.

4. The system of claim 1 wherein the transmitter comprises a first filter that is tuned to provide transmission of signals having frequencies within a predetermined range; the first filter being a low pass filter designed to pass the at least two transmitted predetermined frequency components; and wherein a continuous wave is generated that contains multiple simultaneous frequencies to maximize the peak power on the targeted area for maximum detection and wherein the phases of each of the frequencies contained within the return signal is are measured by the analyzer.

5. The system of claim 1 wherein the predetermined selected frequency range is selected to maximize the response from a nonlinear target at the received frequencies, and the selected frequencies corresponding to operating frequency at which the target transmits or receives; the at least two predetermined frequency components being selected to maximize the response from the target when the target communicates using radio frequencies.

6. The system of claim 1 wherein the transmitter comprises at least two sine wave generators, each sine wave generator operating to transmit a signal at a different predetermined frequency, a combiner for combining the signals at the least two predetermined frequencies operatively connected to the at least two sine wave generators, a first low pass filter operatively connected to the combiner to minimize intermodulation distortion produced by the mixing of multiple frequencies; and a second lowpass filter on the output of the amplifier to minimize harmonic distortion produced by amplifying radio frequencies to a level sufficient to generate nonlinear responses at the target.

7. The system of claim 1 wherein the analyzer utilizes the patterns resulting from the transmit signal frequencies, the power of the transmit signal, the differences between the transmitted signal and the received return signals, the rate of variation of the transmit signal power and/or the rate of variation of the received signal power relative to the rate of variation of the transmit signal to determine the type of electronic device detected using detection methodology based upon one of match filter, Bayesian decision theory, Generalized Likelihood Ratio Test, and constant false alarm rate processing to determine whether a nonlinearity is present.

8. The system of claim 1 wherein the analyzer utilizes the patterns resulting from the transmit signal frequencies, the power of the transmit signal, the differences between the transmitted signal and the received return signals, the rate of variation of the transmit signal power and/or the rate of variation of the received signal power relative to the rate of variation of the transmit signal to classify the type of electronic device detected using a classification method based upon one of Bayesian discriminate functions, nearest neighbor classifiers, support vector machines, neural networks, tree-based algorithms, and unsupervised learning algorithms for determining the type of RF device.

9. The system of claim 1 wherein the receiver is tunable to receive and process odd-order or even-order information, depending upon the harmonic to which the receiver is tuned.

10. A multitone nonlinear radar system comprising:
a transmitter that transmits a signal comprising at least two predetermined frequency components;
a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies and an analyzer configured to analyze the amplitudes of received signals such that by varying the amplitude of the at least two frequency components at a predetermined rate and detecting the rate of change in amplitude of the frequency components of the received signals a detected electronics device may be classified; and
a variable amplifier configured to amplifying the signal to be transmitted operatively connected to the transmitter that varies the amplitude of the at least two frequency components;
whereby by receiving combinations of the at least two predetermined frequency components, and combinations of the harmonics of the at least two predetermined frequency components within the predetermined frequency range, the detection of an electronic device may be determined.

11. The system of claim 10 wherein the system operates to detect whether or not the electronics device is capable of transmitting RF signals; and the detected electronics device may be classified as one of a cellphone or radio.

12. A multitone nonlinear radar system adapted to be used in conjunction with one of the operation of hospital medical equipment in order to avoid interference between unknown electronics devices and the medical equipment and the operation of a plane in order to avoid interference between the operation of detected electronics devices by the passengers and the operation of the plane's electronic equipment, the system comprising:
a transmitter that transmits a signal comprising at least two predetermined frequency components;
a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies, and an analyzer;
whereby electronic devices may be detected and identified by analyzing return signals within a predetermined frequency range.

13. A multitone nonlinear radar system comprising:
a transmitter that transmits a signal comprising at least two predetermined frequency components;
a variable signal generator and an amplifier operatively connected to the transmitter that vary the amplitude and power of the at least two predetermined frequency components,
a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies, and
an analyzer;
whereby electronic devices can be detected and based upon the combinations of the at least two predetermined frequency components, and combinations of the harmonics of the at least two predetermined frequency components, the analyzer analyses the amplitude and power of received signals, whereby by varying the power of the at least two frequency components and detecting the rate of change in amplitude of the frequency components of the return signals, a detected electronics device may be classified as a cellphone or radio.

14. The system of claim 13 wherein the at least one antenna is a single antenna, and wherein the signals transmitted by the transmitter mix with the signals emitted by a target device to enable the generation and reception of mixing products centered on harmonics of the at least two predetermined frequencies.

15. A multitone nonlinear radar system comprising:
a transmitter that transmits a signal comprising at least two predetermined frequency components; the transmitter comprising a waveform generator used as a source of the transmitted signal, a step generator which adjusts the transmit signal power in at least approximately one decibel increments, a low pass filter that attenuates system generated harmonics before amplification, and an amplifier for amplifying the signal to be transmitted;

a receiver operating to receive return signals comprising harmonics of at least two predetermined frequencies, combinations of the at least two predetermined frequency components, and combinations of the harmonics of the at least two predetermined frequency components that are within a predetermined selected frequency range that has been predetermined to enable detection and/or classification of an electronic device;

at least one antenna operating to transmit and receive electromagnetic radiation operatively connected to the transmitter and receiver;

the receiver comprising at least one high pass filter for attenuating linear reflections at the two predetermined frequencies and an analyzer;

whereby electronic devices may be detected and identified by analyzing return signals within a predetermined frequency range.

16. The system of claim 15 wherein the step generator operates to vary the power of the transmitted signal, and wherein the analyzer operates to detect how the harmonics change with varying transmitted power and wherein amplitudes that are received at different transmit powers effects the signature of the electronic device that enable classification as to the type of electronic device and whether or not the electronic device is designed to transmit and receive information.

17. A multitone nonlinear radar system comprising:
a transmitter that transmits a signal comprising at least two predetermined frequency components;
a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies, the at least one high pass filter comprising an adjustable high pass filter; the receiver further comprising an amplifier operatively connected to the at least one adjustable high pass filter for passage of the harmonics within the predetermined selected frequency range and a plurality of band pass filters operatively connected to the amplifier, each of the plurality of band pass filters being limited to reception of a selected harmonic or selected combination of the at least two frequency components or harmonics; and
an analyzer;
whereby electronic devices may be detected and identified by analyzing return signals within a predetermined frequency range.

18. The system of claim 17 wherein the receiver further comprises a plurality of detectors, each of the plurality of detectors being operatively connected to a different one of the plurality of band pass filters and wherein the detectors operate to detect signals within the predetermined selected frequency range of the receiver to output a voltage dependent on the RF power received and wherein how a target responds to differently powered transmitted signals is correlated with the voltage of the detector to determine information concerning the target and wherein the analyzer comprises a classifier which classifies the detected harmonics as originating from different types of electronic devices, the classifier being operatively connected to the plurality of detectors.

19. A multitone nonlinear radar system comprising:
a transmitter that transmits a signal comprising at least two predetermined frequency components;
a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one high pass filter for attenuating linear reflections at the two predetermined frequencies, and
an analyzer comprising an algorithm which looks for patterns in the information and makes a decision as to the target type based on the patterns, the patterns comprising the transmit signal frequencies, the power of the transmit signal, the differences between the transmitted signal and the received return signals, the rate of variation of the transmit signal power and the rate of variation of the received signal power relative to the rate of variation of the transmit signal;
whereby electronic devices may be detected and identified by analyzing return signals within a predetermined frequency range.

20. A method of detecting electronic devices comprising:
providing a transmitter that transmits a signal comprising at least two predetermined frequency components;
providing a receiver operating to receive return signals comprising harmonics of at least two predetermined frequencies, combinations of the at least two predetermined frequency components, and combinations of the harmonics of the at least two predetermined frequency components that are within a predetermined frequency range that has been predetermined to enable detection and/or classification of an electronic device;
at least one antenna operating to transmit and receive electromagnetic radiation operatively connected to the transmitter and receiver;
the receiver comprising at least one filter for attenuating linear reflections at the two predetermined frequencies, and an analyzer;
whereby electronic devices may be detected and identified by analyzing return signals based upon the rate of change of measured power or intensity of the return signal components and wherein amplitudes that are received at different transmit powers in effect provide a signature for the electronic device that enable classification as to the type of electronic device and whether or not the electronic device is designed to transmit and/or receive information.

* * * * *